United States Patent [19]
Arteaga

[11] 3,986,287
[45] Oct. 19, 1976

[54] APPARATUS FOR EXTRACTING A FISH WHICH HAS BEEN HOOKED

[76] Inventor: Jose Gonzalez Arteaga, Zuazo No. 7, Baracaldo (Vizcaya), Spain

[22] Filed: Apr. 8, 1975

[21] Appl. No.: 566,052

[30]  Foreign Application Priority Data
Apr. 9, 1974  Spain .......................... 202163[U]

[52] U.S. Cl. ................................. 43/5; 294/110 A
[51] Int. Cl.² ........................................ A01K 97/14
[58] Field of Search .............. 43/5, 17.2; 294/110 A

[56] References Cited
UNITED STATES PATENTS

| | | | |
|---|---|---|---|
| 472,436 | 4/1892 | Cornelius | 43/5 X |
| 1,056,343 | 3/1913 | Kromann | 294/110 A |
| 3,267,603 | 8/1966 | Josephs et al | 43/5 |

Primary Examiner—Louis G. Mancene
Assistant Examiner—Daniel J. Leach
Attorney, Agent, or Firm—Eric Y. Munson

[57]  ABSTRACT

The invention relates to an apparatus for extracting a fish which has been hooked for use in combination with line fishing means, comprising an L-shaped rod with differing arm lengths, the shorter of which acts as a pivot for a pair of bushings, each of which is connected to one of a pair of branches operating in the manner of scissors, forming respective hooks counterweighted at their top ends. A tube is slidably engaged around the longer arm of the rod, said tube incorporating anchor-points at the lower end for flexible components connected at the other end to the branch counterweights, the arrangement being such that, on pulling the tube sliding on the longer arm of the L-shaped rod, the hooks are closed together to grasp the body of the fish to secure it.

6 Claims, 1 Drawing Figure

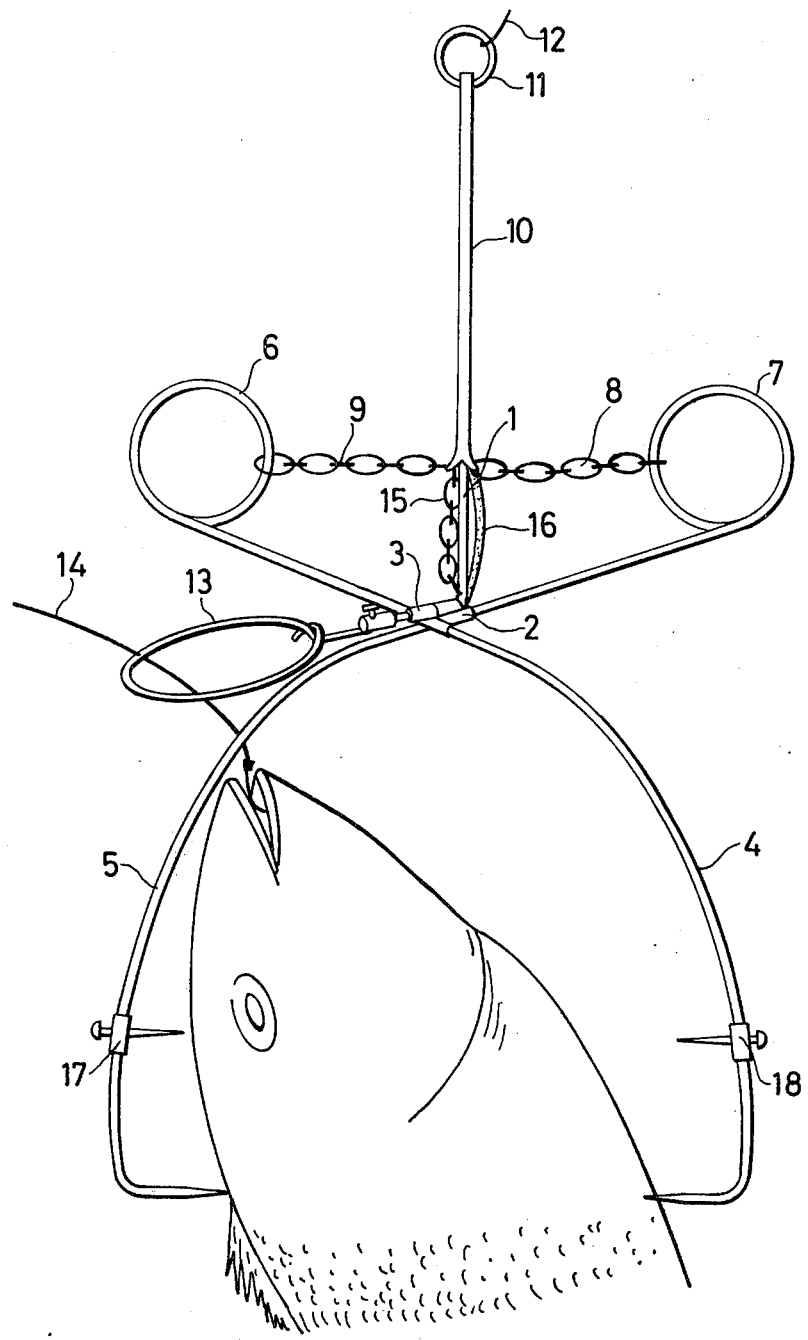

APPARATUS FOR EXTRACTING A FISH WHICH HAS BEEN HOOKED

BACKGROUND OF THE INVENTION

The present invention relates to apparatus for extracting from the water fish which have been hooked, and is to be used more particularly with traditional fishing means such as any type of rod, both for river and sea fishing. It is particularly useful in such cases where fish have to be removed from the hook, and present difficulties in removal from the water using a fishing rod alone, owing to the size or fighting spirit of the fish.

SUMMARY OF THE INVENTION

In accordance with the invention apparatus for extracting a fish which has been hooked comprises an L-shaped rod with differing arm lengths, the shorter of which acts as a pivot for a pair of bushings, each of which is connected to one of a pair of branches operating in the manner of scissors, forming respective hooks counterweighted at their top ends, a tube being slidably engaged around the longer arm of the rod, said tube incorporating anchor-points at the lower end for flexible components connected at the other end to the branch counterweights, the arrangement being such that, on pulling the tube sliding on the longer arm of the L-shaped rod, the hooks are closed together to grasp the body of the fish to secure it.

The operation of the apparatus is particularly simple, since once the fish is caught on the hook and presents difficulties in removal from the water, all that is required is to introduce the apparatus onto the hook-line of the rod, the apparatus having a ring of optional size, so that the apparatus slides by gravity along the hook-line until it reaches the level of the hooked fish. A line or other lead arrangement located at and secured to a ring incorporated on the apparatus is then pulled, thus ensuring the closure together of the pair of hooks with sharp ends, to grasp the body of the catch, following which extraction becomes easy since the fish is not withdrawn by means of the rod, but by pulling on the said line, the hooks remain closed onto the body of the fish until complete extraction is ensured.

In order to slide the assembly through the hook-line of a fishing-rod, the shorter arm of the L-shaped rod has an open ring on the end, allowing the hook line to be fitted and introduced.

In order to retain the tube on the longer arm of the L-shaped rod, a chain connecting the lower or free end of the tube to the elbow of the rod is provided, an elastic component being connected with the chain-length, in the form of a rubber component or spring normally maintaining the tube at a desired distance, depending on the length of the rubber component or spring, from the elbow or folding zone, located at the right angle of the rod, thus creating the necessary hook-opening arrangement, when the extractor arrangement assembly slides towards the catch on the hook.

BRIEF DESCRIPTION OF THE DRAWING

The invention will now be described by way of example with reference to the accompanying drawing, in which the single illustration shows an apparatus according to the invention reacting upon a fish taking the hook, for instance, on the end of a fishing-rod.

DESCRIPTION OF THE PREFERRED EMBODIMENT

It will be seen from the drawing that the arrangement comprises a rod bent into the shape of an L, one of the arms 1, being considerably longer than the other. The shorter arm forms a pivot for a pair of bushings 2, 3 rotating freely on the shorter arm of the rod. Each of the bushings is fixed to respective branches of a scissor type mechanism forming hooks. That is, branch 4 is tangentially joined to the outer surface of sleeve-like hollow bushing 3 which rotates freely about the shorter arm of the rod 1. Similarly, branch 5 is tangentially joined to bushing 2 which rotates freely about the shorter arm of the rod 1 independently of bushing 3. Thus, the shorter arm of the L-shaped rod 1 axially supports the sleeve-like bushings. The branches 4 and 5 have curved and sharp pointed free ends, and rings 6 and 7 at their other ends, acting as counterweights to keep the hooks apart or completely open, for the purpose of passing it along the line of a fishing-rod.

The rings 6, 7 are connected by means of flexible components 8, 9, in this example in the form of lengths of small chain, nylon line or other components, onto the lower end of a tube 10 located on the longer arm 1 of the rod.

The tube 10 has a ring 11 at the top, in which the end of a line 12 may be secured.

The end of the tube 10 serving as anchor-point for the small chains or flexible components 8, 9 is secured to another length of chain 15, which at the other end is secured to the elbow of the rod and there is also in combination with this an elastic component 16, in the form of a rubber component or spring.

The free end of the smaller arm of the L-shaped rod has secured to it a stop for the bushings 2, 3 preventing these from leaving the shorter arm of the rod. The same stop has a fastener allowing it to be secured to the arm and also incorporates a ring 13 which opens as required forming a loop for securing the remainder of the ring, so that a nylon or other line 14 forming the fishing rod line may be passed through it.

The ring 13 is of suitable size to allow access for the rings on the fishing-rod.

The branches 4, 5 are fitted with components as indicated at 17 and 18 in the form of bushings sliding on the respective branches 4 and 5, which can be secured in any required position by means of respective fasteners, and each bushing incorporating a sharp or harpoon shaped point for assisting in the retention of the fish by means of the ends of the hooks of the branches 4 and 5.

It will be appreciated that by means of this arrangement, once the fish can be felt to have bitten onto the hook, as indicated, all that is required is to introduce the apparatus onto the hook-line 14, opening the ring 13 for this, allowing it to slide along the whole of the hook-line, until it reaches the level of the catch, whereupon a sharp pull on the line 12 is exerted, thus raising the tube 10 which slides on the longer arm 1 of the L-shaped rod, against the limited resistance of the elastic component 16. The branches 4 and 5 then close, overcoming the force of the counterweights or rings 6 and 7 on each branch of the mechanism, the catch thus being pinioned by means of the sharp hook ends.

What is claimed is:

1. Apparatus for extracting a fish which has been hooked for use in combination with line fishing means, comprising an L-shaped rod with differing arm lengths, the shorter of which acts as a pivot for a pair of bushings, each of which is connected to one of a pair of branches operating in the manner of scissors, forming respective hooks counterweighted at their top ends, a tube being slidably engaged around the longer arm of the rod, said tube incorporating anchor-points at the lower end for flexible components connected at the other end to the branch counterweights, the arrangement being such that, on pulling the tube sliding on the longer arm of the L-shaped rod, the hooks are closed together to grasp the body of the fish to secure it.

2. Apparatus for extracting a fish which has been hooked, according to claim 1, wherein the free end of the shorten arm of the rod has an opening and closing ring through which a fishing line is passed, to permit sliding of the apparatus.

3. Apparatus for extracting a fish which has been hooked, according to claim 1, in which the sliding movement of the tube in relation to the longer arm of the rod is limited by a flexible component, connected between the lower end of the said tube and the elbow of the rod together with a resilient component therebetween for maintaining the tube in the required position.

4. Apparatus for extracting a fish which has been hooked, according to claim 1, in which the hook branches have bushings which can be secured at any required point, the said bushings being fitted with sharp or harpoon shaped points.

5. Apparatus for extracting a fish which has been hooked, according to claim 1, in which the flexible components are chains and engage with the counterweights which are in the form of respective rings.

6. Apparatus for extracting a fish which has been hooked, according to claim 1, in which the flexible component is a chain and the resilient component is a spring or rubber component.

* * * * *